United States Patent [19]

Domburg et al.

[11] Patent Number: 5,747,441
[45] Date of Patent: May 5, 1998

[54] ENCAPSULATED BLEACH PARTICLES

[75] Inventors: Bastiaan Domburg; Anshu M. Gupta; Hendrik de Ruijter, all of Vlaardingen; Antonius Henricus J. Strijbosch, Maassluis, all of Netherlands

[73] Assignee: Lever Brothers Company, Division of Conopco, Inc., New York, N.Y.

[21] Appl. No.: 720,281

[22] Filed: Sep. 26, 1996

[30] Foreign Application Priority Data

Oct. 16, 1995 [EP] European Pat. Off. ............ 95202784

[51] Int. Cl.$^6$ ................................ C11D 7/54; B05D 7/00
[52] U.S. Cl. .................. 510/375; 510/376; 252/186.25; 427/212; 427/213; 428/403
[58] Field of Search ................................ 510/375, 376; 252/186.23–186.37; 428/402.2, 402.24, 403; 427/212, 213

[56] References Cited

U.S. PATENT DOCUMENTS

| | | | |
|---|---|---|---|
| 3,996,152 | 12/1976 | Edwards et al. | 252/186 |
| 4,837,008 | 6/1989 | Rudy et al. | 424/53 |
| 5,336,433 | 8/1994 | Lagnemo et al. | 252/186.23 |

FOREIGN PATENT DOCUMENTS

| | | |
|---|---|---|
| 0 573 731 | 12/1993 | European Pat. Off. . |
| 0 653 485 | 5/1995 | European Pat. Off. . |
| 2008778 | 9/1970 | Germany . |
| 58-007497 | 1/1983 | Japan . |
| WO 94/12613 | 6/1994 | WIPO . |
| WO 94/19449 | 9/1994 | WIPO . |

*Primary Examiner*—Margaret Einsmann
*Attorney, Agent, or Firm*—Milton L. Honig

[57] ABSTRACT

An encapsulated bleach particle is provided, comprising (a) 1–30% by weight of a coating including a gelled polymer material (as herein defined);

(b) 99–70% by weight of a core material selected from the group consisting of a peroxygen bleach compound, a bleach catalyst, and a bleach precursor.

This particle was found to have both favourable storage stability and good solubility characteristics. Furthermore, a process for producing encapsulated particles having said composition is provided.

9 Claims, No Drawings

ENCAPSULATED BLEACH PARTICLES

FIELD OF THE INVENTION

This invention is concerned with encapsulated bleach particles having a solid core material, which remain stable for use in liquid and granular detergent cleaning products. A method for producing said encapsulated particles is also disclosed.

BACKGROUND OF THE INVENTION

It is well known in the detergent art to protect sensitive solid constituents of a detergent formulation, such as bleach components, from an incompatible environment by separating them physically from their environment, for example by encapsulation.

Bleach particles have been coated with a variety of materials. In U.S. Pat. No. 3,908,045 (Alterman et al), bleach particles are disclosed which are coated with fatty acids, polyvinyl alcohol or polyethylene glycols. Other known coating materials include polymer latex (U.S. Pat. No. 4,759,956); polycarboxylate materials (U.S. Pat. No. 4,762,637); polyethylene waxes of melting point 50°–65° C. (EP-A-132,184); and various waxes (U.S. Pat. No. 4,421,669).

Since the improved bleach stability as a result of conventional coatings often appeared to be insufficient, attempts have been made to improve said stability of encapsulated bleach particles by applying a second coat.

However, these known encapsulation methods often produce encapsulates which are still incapable to standing up to long-term storage and/or are too expensive to be commercially viable.

A further potential problem with the known systems is that the encapsulating materials providing the protection may themselves have an adverse interaction with the bleach components to be protected.

As an alternative to these encapsulation techniques, WO-A-94/12613 discloses a method of protecting a bleach component by dissolving said component in a biopolymer, resulting in a particulate bleach product comprising a molecular solid solution of the bleach in the biopolymer. However, this method was found to be less suitable for those bleach components which are typically present in a detergent composition, in amounts of more than 5% by weight based on the composition.

One object of the invention is to provide a single coat encapsulated bleach particle which has improved stability to degradation by other components of the formulation in which this type of particle is present, by humidity, high temperature or aqueous liquid media.

Another object is to provide a particulate encapsulated bleach having a coat with good solubility characteristics such that the bleach material is released in a controlled way during the wash.

A further object of the invention is to provide an encapsulation process which is free of organic solvents that lead to environmental pollution problems. A still further object is to provide an encapsulated bleach material which does not interact unfavourably with fabrics.

It was surprisingly found that these and other objects could be achieved when a gelled polymer material is used as coating film for the bleach. Thus coated detergent bleach particles were found to have both good stability and excellent solubility characteristics, which was not expected since gelled polymers, such as gelled alginate, used in the food industry are known to lack solubility.

Definition of the Invention

Accordingly, in a first aspect the present invention provides an encapsulated bleach particle, comprising
(a) 1–30% by weight of a coating including a gelled polymer material (as herein defined);
(b) 99–70% by weight of a core material selected from the group consisting of a peroxy bleaching agent, a bleach catalyst, and a peroxygen bleach precursor.

In a second aspect, the invention provides a bleaching detergent composition, comprising surfactant material, builder material and encapsulated bleach particles according to the present invention, the concentration of these particles in said composition being preferably in the range of 2–40%, more preferably 2–30% by weight.

DETAILED DESCRIPTION OF THE INVENTION

The Coating

The gelled polymer contained in the coating of the encapsulated bleach particle of the present invention is defined as a polymer of which the molecular structure is partially or fully cross-linked, whereby the degree of cross-linking can be accurately controlled. This polymer can generally be selected from the group of agar, alginate, carrageenan, casein, gellan gum, gelatin, pectin, whey proteins, egg protein gels and combinations thereof. The polymer is preferably an alginate.

The gelled polymer is present in the coating at a level of preferably 20–100% by weight, more preferably 50–100% by weight, the other coating constituents being usual coating materials known per se.

For obtaining favourable results in respect of storage stability and solubility characteristics, at least 10% by weight of the gelled polymer is preferably cross-linked with alkaline earth metal ions. More preferably, at least 30% by weight of the gelled polymer is cross-linked in this way. Calcium ions are preferred for use as cross-linking alkaline earth metal ions.

For the alginate polymer material, the phenomena of cross-linking resulting in gelling can be understood as follows. $Ca^{2+}$-ions are known to bind salts of alginic acid. Alginic acid polymers consist of mannuronic and guluronic acid segments. It is believed that the gel forming ability is related primarily to the sequencing of guluronic segments in the alginic acid polymer. The $Na^+$-ion in the sodium salt of alginic acid allows replacement of itself with divalent calcium ions, which form bridges necessary to bind different polymer segments and obtain the above-mentioned sequencing. The extent to which said binding of polymer segments has taken place can be estimated by measuring the ratio of $Ca^{2+}$ to $Na^+$ ions in the cross-linked sample. On this basis, the degree (x) of cross-linking of the alginate material is defined as follows:

$$x = \frac{2\,Ca^{2+}}{2\,Ca^{2+} + Na^+}$$

It was found that manipulating the degree of cross-linking provides a powerful tool for controlling the properties of the encapsulated particles of the invention.

The coating is desirably coherent and uniform. When used in detergent powders, the encapsulated particles of the invention have a mean particle size of generally 200–2500 microns, preferably 500–1500 μm.

When used in detergent liquid formulations, the encapsulated particles of the invention generally have a mean particle size in between 10 and 200 μm.

It is essential that the mean particle size of these particles is such that segregation is avoided when they are present in a fully formulated composition. The coating of the encapsulated particles of the invention consitutes preferably 1–20% by weight, more preferably 1–10% by weight of the final particle (i.e. core plus coating).

Core Materials

The solid core of the particle of the present invention preferably constitutes 70–99%, more preferably 90–80% by weight of this particle. The core materials are selected from the group consisting of a peroxygen bleach compound, a bleach catalyst and a bleach precursor. All these core materials are unstable in aqueous or humid environment and will lose activity without a coating.

Some of the core materials may be obtained commercially in a form which meets preferred physical characteristics with respect to size and shape thereof. The preferred shape is spherical or as close to this geometry as possible. Many of the other active core materials which may be suitably used in the encapsulated particle of the present invention are not commercially available with these preferred characteristics. It is then beneficial to produce composite core particles consisting of the active core ingredient and an agglomerating agent. The agglomerating agent must be stable and inert with respect to the active core material. Optionally, an inert material meeting the same specifications as the agglomerating agent may be added to the agglomerated core particles.

Bleaching Agent

The Peroxy Bleaching Agent

The peroxy bleaching agents may be effectively used as core material for the particle of the invention.

In the context of the invention, these agents are preferably compounds which are capable of yielding hydrogen peroxide in aqueous solution. Hydrogen peroxide sources are well known in the art. They include the alkali metal peroxides, organic peroxides such as urea peroxide, and inorganic persalts, such as the alkali metal perborates, percarbonates, perphosphates persilicates and persulphates. Mixtures of two or more such compounds may also be suitable.

Particularly preferred are sodium perborate tetrahydrate and, especially, sodium perborate monohydrate. Sodium perborate monohydrate is preferred because of its high active oxygen content. Sodium percarbonate may also be preferred for environmental reasons.

Alkylhydroxy peroxides are another class of suitable peroxy bleaching agents. Examples of these materials include cumene hydroperoxide and t-butyl hydroperoxide.

Organic peroxyacids are a further class of peroxy bleaching agents which may be used as bleach core. Such materials normally have the general formula:

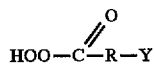

wherein R is an alkylene or substituted alkylene group containing from 1 to about 20 carbon atoms, optionally having an internal amide linkage; or a phenylene or substituted phenylene group; and Y is hydrogen, halogen, alkyl, aryl, an imido-aromatic or non-aromatic group, a COOH or

group or a quaternary ammonium group.

Typical monoperoxy acids useful herein include alkyl peroxy acids and aryl peroxy acids, for example:

(i) peroxybenzoic acid and ring-substituted peroxybenzoic acids, e.g. peroxy-α-naphthoic acid;
(ii) aliphatic, substituted aliphatic and arylalkyl monoperoxyacids, e.g. peroxylauric acid, peroxystearic acid and N,N-phthaloylaminoperoxy caproic acid (PAP); and
(iii) 6-octylamino-6-oxo-peroxyhexanoic acid.

Typical diperoxyacids useful herein include, for example:
(iv) 1,12-diperoxydodecanedioic acid (DPDA);
(v) 1,9-diperoxyazelaic acid;
(vi) diperoxybrassilic acid; diperoxysebacic acid and diperoxyisophthalic acid;
(vii) 2-decyldiperoxybutane-1,4-dioic acid;
(viii) 4,4'-sulphonylbisperoxybenzoic acid; and
(ix) N,N'-Terephthaloyl-di(6-aminoperoxycaproic acid) (TPCAP).

Inorganic peroxyacid compounds may also be suitable as cores for the particles of the present invention. Examples of these materials are salts of monopersulphate, such as potassium monopersulphate (MPS).

All these peroxy compounds may be utilized alone or in conjunction with a peroxyacid bleach precursor and/or an organic bleach catalyst not containing a transition metal.

Bleach Catalysts

Bleach catalysts are also suitable as the core material of the present invention. Such suitable catalysts include a manganese (II) salt compound as described in U.S. Pat. No. 4,711,748. Other suitable catalysts, e.g. sulfonimine compounds, are described in U.S. Pat. No. 5,041,232 issued to Batal et al. The catalysts may be admixed with, or adsorbed upon other compatible ingredients. Product formulations containing encapsulated bleach catalysts of the present invention may also contain a bleaching agent whose action is to be catalyzed. That bleaching agent may also be optionally encapsulated according to the present invention.

Peroxygen Bleach Precursors

Peracid precursors, preferably in granular form, are also suitable as cores for the particles of the present invention. Peracid precursors are compounds which react in the bleaching solution with hydrogen peroxide from an inorganic peroxygen source to generate an organic peroxy acid. They are also susceptible to hydrolysis, and cannot normally be formulated directly into aqueous cleaning compositions. Peracid precursors, encapsulated according to the present invention, would be incorporated into products along with a source of hydrogen peroxide, which also could optionally be encapsulated according to the present invention.

Peracid precursors for peroxy bleach compounds have been amply described in the literature, including in British Patent Nos. 836,988; 855,735; 907,356; 907,358; 907,950; 1,003,310 and 1,246,339; U.S. Pat. No. 3,332,882 and U.S. Pat. No. 4,128,494; and Canadian Patent No. 844,481.

Typical examples of precursors are polyacylated alkylene diamines, such as N,N,N',N'-tetraacetylethylene diamine (TAED) and N,N,N',N'-tetraacetylmethylene diamine (TAMD); acylated glycolurils, such as tetraacetylglycoluril (TAGU); triacetylcyanurate, sodium sulphophenyl ethyl carbonic acid ester, sodium acetyloxybenzene sulfonate (SABS), sodium nonanoyloxybenzene sulfonate (SNOBS) and choline sulfophenyl carbonate.

Peroxybenzoic acid precursors are known in the art, e.g., from GB-A-836988. Examples thereof are phenylbenzoate; phenyl p-nitrobenzoate; o-nitrophenyl benzoate; o-carboxyphenyl benzoate; p-bromophenyl benzoate; sodium or potassium benzoyloxybenzenesulfonate; and benzoic anhydride.

Preferred peroxygen bleach precursors for use in the particle according to the present invention, are sodium-4- benzoyloxy benzene sulphonate (SBOBS); N,N,N'N'-tetraacetyl ethylene diamine (TAED); sodium-1-methyl-2-benzoyloxy benzene-4-sulphonate; sodium-4-methyl-3-benzoyloxy benzoate; 2-(N,N,N,-trimethyl ammonium) ethyl sodium-4-sulphonphenyl carbonate chloride (SPCC); trimethyl ammonium toluyloxy-benzene sulphonate; sodium nonanoyloxybenzene sulphonate (SNOBS); sodium 3,5,5-trimethyl hexanoyloxybenzene sulphonate (STHOBS); and the substituted cationic nitriles. TAED is the most preferred bleach precursor.

The Process of Producing the Coated Particles

Preferably, the process of the invention comprises the steps of
(i) atomizing an aqueous suspension containing both the polymer to be gelled and the core material;
(ii) gelling the thus obtained droplets; and
(iii) drying the gelled droplets to form dry free-flowing particles.

To obtain the best results with regard to homogeneity and uniformity of the particles to be obtained, these steps are desirably carried out sequentially, without interruption.

As a first step of said preferred process for producing the coated particles of the invention, an aqueous suspension containing both the polymer to be gelled and the core material is atomized. Atomization techniques are well-known in the art. Favourable results have been obtained when atomization is carried out by applying mechanical disturbance to a streaming aqueous suspension of the polymer to be gelled and the core material. In a specific example, mechanical disturbance is achieved by applying resonating nozzles. This technique offers the advantage of tight control of particle size distribution while retaining a good potential for scale-up of the process. Other atomization techniques are those in which use is made of one-phase nozzles, two-phase nozzles, and spinning discs.

The gelling step is preferably performed in a bath containing alkaline earth metal ions or in a falling film reactor. The drying step is preferably carried out in a fluid bed.

The Surface-Active Material

The bleaching detergent composition according to the invention generally contains surface-active material in an amount of from 10 to 50% by weight. The surface-active material may be naturally derived, such as soap, or a synthetic material selected from anionic, nonionic, amphoteric, zwitterionic, cationic actives and mixtures thereof. Many suitable actives are commercially available and are fully described in the literature, for example in "Surface Active Agents and Detergents", Volumes I and II, by Schwartz, Perry and Berch.

Typical synthetic anionic surface-actives are usually water-soluble alkali metal salts of organic sulphates and sulphonates having alkyl radicals containing from about 8 to about 22 carbon atoms, the term alkyl being used to include the alkyl portion of higher aryl radicals. Examples of suitable synthetic anionic detergent compounds are sodium and ammonium alkyl sulphates, especially those obtained by sulphating higher ($C_8$–$C_{18}$) alcohols produced, for example, from tallow or coconut oil; sodium and ammonium alkyl ($C_9$–$C_{10}$) benzene sulphonates, particularly sodium linear secondary alkyl ($C_{10}$–$C_{15}$) benzene sulphonates; sodium alkyl glyceryl ether sulphates, especially those esters of the higher alcohols derived from tallow or coconut oil fatty acid monoglyceride sulphates and sulphonates; sodium and ammonium salts of sulphuric acid esters of higher ($C_9$–$C_{18}$) fatty alcohol alkylene oxide, particularly ethylene oxide, reaction products; the reaction products of fatty acids such as coconut fatty acids esterified with isethionic acid and neutralised with sodium hydroxide; sodium and ammonium salts of fatty acid amides of methyl taurine; alkane mono-sulphonates such as those derived by reacting alpha-olefins ($C_8$–$C_{20}$) with sodium bisulphite and those derived by reaction paraffins with $SO_2$ and $C_{12}$ and then hydrolysing with a base to produce a random sulphonate; sodium an ammonium $C_7$–$C_{12}$ dialkyl sulphosuccinates; and olefin sulphonates which term is used to describe material made by reacting olefins, particularly $C_{10}$–$C_{20}$ alpha-olefins, with $SO_3$ and then neutralising and hydrolysing the reaction product. The preferred anionic detergent compounds are sodium ($C_{10}$–$C_{15}$) alkylbenzene sulphonates, and sodium ($C_{16}$–$C_{18}$) alkyl ether sulphates.

Examples of suitable nonionic surface-active compounds which may be used, preferably together with the anionic surface-active compounds, include, in particular, the reaction products of alkylene oxides, usually ethylene oxide, with alkyl ($C_6$–$C_{22}$) phenols, generally 5–25 EO, i.e. 5–25 units of ethylene oxides per molecule; and the condensation products of aliphatic ($C_8$–$C_{18}$) primary or secondary linear or branched alcohols with ethylene oxide, generally 2–30 EO. Other so-called nonionic surface-actives include alkyl polyglycosides, sugar esters, long-chain tertiary amine oxides, long-chain tertiary phosphine oxides and dialkyl sulphoxides.

Amphoteric or zwitterionic surface-active compounds can also be used in the composition of the invention but this is not normally desired owing to their relatively high cost. If any amphoteric or zwitterionic detergent compounds are used, it is generally in small amounts in compositions based on the much more commonly used synthetic anionic and nonionic actives.

The bleaching detergent composition of the invention will preferably comprise from 1–15% wt of anionic surfactant and from 10–40% by weight of nonionic surfactant.

The Detergency Builder

The bleaching detergent composition of the invention normally and preferably also contains a detergency builder in an amount of from about 5–80% by weight, preferably from about 10–60%. by weight.

Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate; nitrilotriacetic acid and its water-soluble salts; the alkali metal salts of carboxymethyloxy succinic acid, ethylene diamine tetraacetic acid, oxydisuccinic acid, mellitic acid, benzene polycarboxylic acids, citric acid; and polyacetal carboxylates as disclosed in U.S. Pat. No. 4,144,226 and U.S. Pat. No. 4,146,495.

Examples of precipitating builder materials include sodium orthophosphate and sodium carbonate.

Examples of calcium ion-exchange builder materials include the various types of water-insoluble crystalline or amorphous aluminosilicates, of which zeolites are the best known representatives, e.g. zeolite A, zeolite B (also know as Zeolite P), zeolite C, zeolite X, zeolite Y and also the zeolite P type as described in EP-A-0,384,070.

In particular, the compositions of the invention may contain any one of the organic and inorganic builder materials, though, for environmental reasons, phosphate builders are preferably omitted or only used in very small amounts. Typical builders usable in the present invention are, for example, sodium carbonate, calcite/carbonate, the sodium salt of nitrilotriacetic acid, sodium citrate, carboxymethyloxy malonate, carboxymethyloxy succinate and the water-insoluble crystalline or amorphous aluminosilicate builder material, each of which can be used as the main builder, either alone or in admixture with minor amounts of other builders or polymers as co-builder.

It is preferred that the composition contains not more than 5% by weight of a carbonate builder, expressed as sodium carbonate, more preferable not more than 2.5% by weight to substantially nil, if the composition pH lies in the lower alkaline region of up to 10.

Other Ingredients

Apart form the components already mentioned, the bleaching detergent composition of the invention can contain any of the conventional additives in amounts of which such materials are normally employed in fabric washing detergent compositions. Examples of these additives include buffers such as carbonates, lather boosters, such as alkanolamides, particularly the monoethanol amides derived from palmkernel fatty acids and coconut fatty acids; lather depressants, such as alkyl phosphates and silicones; anti-redeposition agents, such as sodium carboxymethyl cellulose and alkyl or substituted alkyl cellulose ethers; stabilizers, such as phosphonic acid derivatives (i.e. Dequest® types); fabric softening agents; inorganic salts and alkaline buffering agents, such as sodium sulphate, sodium silicate etc.; and usually in very small amounts, fluorescent agents; perfumes; enzymes, such as proteases, cellulases, lipases, amylases and oxidases; germicides and colourants.

Of the additives, transition metal sequestrants, such as EDTA and the phosphonic acid derivatives, e.g. ethylene diamine tetra-(methylene phosphonate)-EDTMP- are of special importance, as not only do they improve the stability of sensitive ingredients, such as enzymes, fluorescent agents, perfumes and the like, but also improve the bleach performance, especially at the higher pH region of above 10, particularly at pH 10.5 and above.

A highly desirable additive ingredient with multifunctional characteristics in detergent compositions is from 0.1% to about 3% by weight of a polymeric material having a molecular weight of from 1,000 to 2,000,000 and which can be a homo- or co-polymer of acrylic acid, maleic acid, or salt or anhydride thereof, vinyl pyrrolidone, methyl- or ethylvinyl ethers, and other polymerizable vinyl monomers. Preferred examples of such polymeric materials are polyacrylic acid or plyacrylate; polymaleic acid/acrylic acid copolymer; 70-30 acrylic acid/hydroxyethyl maleate copolymer; 1:1 styrene/maleic acid copolymer; isobutylene/maleic acid and diisobutylene/maleic acid copolymers; methyl- and ethylvinylether/maleic acid copolymers; ethylene/maleic acid copolymer; polyvinyl pyrrolidone; and vinyl pyrrolidone/maleic acid copolymer.

The bleaching detergent composition of the invention can be formulated in any suitable form, such as the powdered or granulated, the liquid or paste-like form. When formulated as free-flowing particles, e.g. in powdered or granulated form, the bleaching detergent composition can be produced by any of the conventional techniques employed in the manufacture of detergent compositions, for instance by slurry-making, followed by spray-drying to form a detergent base powder to which the heat-sensitive ingredients and optionally some other ingredients as desired can be added as dry substances. It will thus be appreciated, that the detergent base powder composition, to which the particles of the present invention are added, can itself be made in a variety of ways, such as the so-called part-part processing, non-tower route processing, dry-mixing, agglomeration, granulation, extrusion, compacting and densifiying processes etc., such ways being well known to those skilled in the art and not forming the essential part of the present invention.

The following non-limiting examples will more fully illustrate the embodiments of the invention. All parts and percentages referred to herein are by weight unless otherwise indicated.

In the Examples the following abbreviations are used:

Manugel DM,: different grades of sodium alginate, ex
Manugel DH: Kelco international (division of Merck)
Manugel GMB:
Protonal SF120M: Sodium alginate, ex Pronova Biopolymers;
Na-PAS : sodium salt of primary alkyl sulphate;
Nonionic 7EO: nonionic surfactant; $C_{12}$–$C_{14}$ ethoxylated alcohol containing an average of 7 ethylene oxide group per molecule, ex ICI;
Nonionic 3EO: nonionic surfactant; $C_{12}$–$C_{14}$ ethoxylated alcohol containing an average of 3 ethylene oxide groups per molecule, ex ICI;
Soap: sodium salt of stearic acid;
Zeolite A 24: crystalline sodium aluminosilicate, ex Crosfield;
Maxacal CX 600K: enzyme granules, ex Genencor;
Dequest 2047: phosphonic acid derivative;
Coated Percarbonate: Boron coated percarbonate, ex Interox

EXAMPLES 1, 2, COMPARATIVE EXAMPLE A

TAED alginate granules were prepared using the following procedure.

900 ml of 1% solution of alginate was made in demi water. The sodium alginate used (having tradename Manugel DM) was obtained from Kelco International. The sodium and calcium levels in the dry Manugel DM were determined by X-ray fluorescense to be 7.33% and 0.137% by weight respectively. The alginate solution was made by intensive mixing using a very high shear mixer (Ultra Turrax) and by introducing the required levels of alginate slowly.

TAED (ex Hoechst) was subsequently introduced in the thus prepared alginate solution, while continuing the mixing operation. Two levels of TAED dispersions were prepared: 171 grams TAED respectively 36 grams TAED in 900 ml of alginate solution. The TAED had an average particle size of 90 microns and its activity was 97% ( as measured by volumetric titration).

The thus prepared TAED dispersions (also called: slurries) were fed to a two-phase nozzle through as pressurized vessel. A small over-pressure was applied to facilitate the flow. The two-phase nozzle had an internal diameter of 1.0 mm. The amount of air introduced was regulated to provide droplets of desired particle size.

The thus atomized droplets were fed into a calcium bath having a capacity of 1.5 liter. Calcium chloride salt was used to provide 0.1 M $Ca^{2+}$ solution. A cross-linking time of 20 minutes was applied before the thus formed wet gelled granules were removed by filtration. These granules were subsequently dried in a fluid bed at 70° C. for 15 minutes, and finally sieved to obtain the desired particle size distribution.

In addition, for reasons of comparison, a reference sample of sulphate containing granulated TAED particles was prepared using a method known per se.

The process conditions applied and the granule compositions obtained are illustrated in Table 1.

TABLE 1

| Example no. | 1 | 2 | A |
|---|---|---|---|
| Slurry composition (in %) | | | |
| water | 83.2 | 95.2 | |
| Manugel DM | 0.8 | 1.0 | |
| TAED | 16.0 | 3,8 | |
| Calcium bath | 0.1 M | 0.1 M | |
| Dry gelled granule composition (in %) | | | |
| TAED | 88.3 | 68.3 | 80.0 |
| sodium | 0.65 | 0.25 | |
| calcium | 0.93 | 2.18 | |
| alginate | 5 | 15 | |
| sulphate | | | 10.0 |
| other filler/binder | | | 7.0 |
| minors/water | 5.14 | 14.27 | 3.0 |

EXAMPLES 3, 4

| | (% by weight) |
|---|---|
| Na-PAS | 12.68 |
| Nonionic 7EO | 8.21 |
| Nonionic 3EO | 5.47 |
| soap | 2.14 |
| Zeolite A-24 (anhydrous) | 44.54 |
| Na citrate | 5.89 |
| Light soda ash | 3.19 |
| Antifoam granule | 5.55 |
| Na bicarbonate | 1.38 |
| Maxacal CX 600 k 2019 GU/mg | 2.08 |
| Moisture, Minors | 8.88 |

The solubility tests were performed in a 1 liter demi water bath kept at a constant temperature of 40° C.

In the first test, the detergent base composition illustrated above was used together with a 710–1000 microns sieve fraction of the coated TAED granules prepared in Example 1.

The second test was performed without the presence of the detergent base composition in order to illustrate the effect of said detergent base composition on the solubility of alginate-coated TAED granules. In this second test, the same sieve fraction of the coated TAED granules prepared in Example 1, was used.

Aqueous wash solutions with compositions as indicated in Table 2 were prepared and TAED release was measured by withdrawing 25 ml aliquots from the aqueous wash solutions after the indicated time periods and determining TAED levels by standard peracid volumetric titration. The results with respect to TAED dissolution characteristics are shown in Table 2.

TABLE 2

| Example no. Composition of wash solution | 3 (g/l) | 4 (g/l) |
|---|---|---|
| Detergent base formulation | 7.45 | — |
| Coated percarbonate | 2.05 | 2.00 |
| TAED granules (710–1000 microns) | 0.5 | 0.5 |
| Dequest 2047 | 0.03 | 0.1 |
| TAED release (in g/l) after time period (minutes) | | |
| 5 | 0.151 | 0.169 |
| 10 | 0.392 | 0.278 |
| 15 | 0.422 | 0.351 |
| 20 | 0.415 | 0.408 |
| 25 | 0.417 | 0.404 |
| 30 | 0.422 | 0.406 |

It is thus clearly demonstrated that in the presence of a standard detergent formulation the coated TAED granules of the invention have favourable solubility, and that in the absence of such detergent formulation the TAED-alginate granules dissolve somewhat more slowly.

EXAMPLES 5–7, COMPARATIVE EXAMPLE B

Stability tests were carried out by mixing the detergent base composition of Example 3 with various TAED-alginate granules and percarbonate, and storing the thus obtained mixtures in a climate cell at 37° C. and 70% humidity during a period of 4 weeks.

The mixture of Example 5 contained a 710–1400 microns sieve fraction of the alginate-coated TAED granules prepared in Example 1.

The mixtures of Examples 6 and 7 contained a 500–710 microns sieve fraction respectively a 710–1400 microns sieve fraction of the alginate-coated TAED granules prepared in Example 2.

The mixture of Example B contained a 710–1400 microns sieve fraction of the sulphate containing TAED granules prepared in Example A.

The compositions prepared for stability testing and the stability results (i.e. the TAED activity after the indicated storage periods, in terms of the measured level—in % by weight—of TAED in the composition) are shown in Table 3.

TABLE 3

| Example no. | 5 | 6 | 7 | B |
|---|---|---|---|---|
| Sample Composition (in grams) | | | | |
| Detergent base formulation | 14.5 | 14.5 | 14.5 | 14.5 |
| coated percarbonate | 4.1 | 4.1 | 4.1 | 4.1 |
| TAED-granules, 710–1400 (example 1) | 1.3 | | | |
| TAED-granules, 500–710 (example 2) | | 1.3 | | |
| TAED-granules, 710–1400 (example 2) | | | 1.3 | |
| TAED-granules, 710–1400 (example A) | | | | 1.3 |
| Dequest 2047 | 0.08 | 0.08 | 0.08 | 0.08 |
| TAED Activity (% TAED) after storage period (in weeks) | | | | |
| 0 | 5.3 | 4.1 | 3.7 | 4.8 |
| 1 | 5.3 | 4.0 | 3.7 | 4.1 |
| 2 | 4.8 | 3.6 | 3.5 | 2.8 |
| 3 | 4.5 | 3.3 | 3.2 | 2.6 |
| 4 | 4.2 | 3.0 | 3.0 | 2.3 |

It can clearly be noticed that alginate-coated TAED granules have outstanding stability in standard particulate detergent compositions. Furthermore two remarkable observations can be made:

(i) very high levels of TAED loadings are possible. The 88% TAED granules of example 1 were observed to have a higher stability than the 80% reference granules of Example A. This can be derived from the above Table 3 when comparing the stability results of Example 5 with those of Example B;

(ii) when comparing the stability results of Example 6 with those of Example B, it can be noticed that smaller particle sizes of particles according to the invention offer significantly better stability than larger particles of the prior art.

EXAMPLES 8–11

These examples illustrate that excellent storage stability of TAED granules can be obtained when using several different grades of alginate material as a coating for these granules.

Four different alginate-coated TAED granules were tested in this series, the composition of the slurry used for making these TAED granules being illustrated in Table 4.

TABLE 4

| Example no. | 8 | 9 | 10 | 11 |
|---|---|---|---|---|
| Slurry composition (in %) | | | | |
| demin water | 83.2 | 70.8 | 82.8 | 83.1 |
| Manugel DM | 0.9 | | | |
| Manugel DM | | 1.45 | | |
| Manugel GMB | | | 0.85 | |
| Protonal SF120M | | | | 0.85 |
| TAED | 15.9 | 27.7 | 16.4 | 16.1 |

The two-phase nozzle assembly as described in Examples 1 and 2 above, was used to atomize this slurry. The internal diameter of the nozzle was 1.0 mm and an over-pressure of 0.5–0.8 bar was applied to achieve atomization. The cross-linking step was carried out in a 0.1M CaCl$_2$ solution. A cross-linking time of 10 minutes was applied. The thus formed wet gelled granules were removed by filtration and subsequently dried in a fluid bed at 70° C. for 15 minutes. The 500–710 microns sieve fraction was sieved out from the dried granules and further tested. The level of TAED in the obtained granules was in the range of 88–90 by weight.

Solubility and storage tests were performed using the base composition of example 3 together with coated percarbonate and the thus obtained TAED granules. The following total detergent formulations were used for these tests (see Table 5).

TABLE 5

| Example | 8 | 9 | 10 | 11 | C |
|---|---|---|---|---|---|
| Total Composition (in %) | | | | | |
| Detergent base composition | 73 | 73 | 73 | 73 | 73 |
| Coated percarbonate | 20.5 | 20.5 | 20.5 | 20.5 | 20.5 |
| TAED granules (500–710 μm) | 6.5 | 6.5 | 6.5 | 6.5 | 6.5 |

It can be seen that Table 5 also shows a comparative example C relating to a reference composition including sulphate containing TAED granules having a composition equal to that of the granules of Example A (see Table 1).

The solubility was tested by dosing 10 grams of the total detergent compositions shown in Table 5, in a 1 liter demi water bath kept at a constant temperature of 40° C., for obtaining aqueous wash solutions. The level of the TAED released in said solutions was measured as indicated in Examples 3, 4. The results with respect to TAED dissolution characteristics are shown in Table 6, as a percentage of the TAED initially present in the total detergent compositions.

TABLE 6

| Example no. | 8 | 9 | 10 | 11 | C |
|---|---|---|---|---|---|
| TAED-release (in %) after time-period (minutes) | | | | | |
| 5 | 96.4 | 90.8 | 74.2 | 75.1 | 98.9 |
| 10 | 100.0 | 100.0 | 98.9 | 100.0 | 95.0 |
| 15 | 99.5 | 94.6 | 97.4 | 98.9 | 96.1 |
| 20 | 97.4 | 96.2 | 100.0 | 97.9 | 91.0 |

The storage stability of the total compositions shown in Table 5 was measured by storing 20 grams of said compositions in plastic cups having a perforated lid and placed in a climate cell at 37° C. and 70% humidity. Periodically, the cups were removed and the compositions contained therein titrated, for determining remaining active TAED levels. The stability results results (i.e. the TAED activity remaining after the indicated storage periods, expressed as a percentage of the TAED initially present in the compositions) are shown in Table 7.

TABLE 7

| Example no. | 8 | 9 | 10 | 11 | C |
|---|---|---|---|---|---|
| TAED activity (%) after storage period (weeks) | | | | | |
| 0 | 100 | 100 | 100 | 100 | 100 |
| 1 | 92.5 | 95.8 | 96.8 | 93.2 | 93.4 |
| 2 | 82.5 | 90.4 | 87.0 | 79.0 | 79 |
| 3 | 74.7 | 85 | 81.3 | 71.2 | 67.5 |
| 4 | 63.1 | 77 | 73.9 | 64.9 | 48.8 |

It can be seen that the alginate coated TAED granules exhibit a higher stability than the sulphate containing granules of the prior art.

We claim:

1. Dry free-flowing encapsulated bleach particle, comprising:
   (a) 1–30% by weight of a coating including a gelled polymer material which is an alginate wherein at least 10% by weight of the gelled polymer material is cross-linked with alkaline earth metal ions;
   (b) 99–70% by weight of a core material selected from the group consisting of a peroxygen bleach compound, a bleach catalyst, and a peroxygen bleach precursor, and the core material being surrounded by the coating.

2. Particle according to claim 1, wherein the gelled polymer material is cross-linked with calcium ions.

3. Particle according to claim 1, wherein 20–100% by weight of the coating consists of the gelled polymer material.

4. Particle according to claim 1, wherein the core material is a peroxygen bleach precursor.

5. Particle according to claim 4, wherein the peroxygen bleach precursor is selected from the group consisting of sodium-4-benzoyloxy benzene sulphonate (SBOBS); N,N,N'N'-tetraacetyl ethylene diamine (TAED); sodium-1-methyl-2-benzoyloxy benzene-4-sulphonate; sodium-4-methyl-3-benzoyloxy benzoate; 2-(N,N,N,-trimethyl ammonium) ethyl sodium-4-sulphonphenyl carbonate chloride (SPCC); trimethyl ammonium toluyloxy-benzene sulphonate; sodium nonanoyloxybenzene sulphonate (SNOBS); sodium 3,5(5-trimethyl hexanoyloxybenzene sulphonate (STHOBS); and the substituted cationic nitriles.

6. Process for producing a bleach particle, said process comprising the steps of:

(i) atomizing an aqueous suspension comprising an alginate polymer and a core material selected from the group consisting of a peroxygen bleach compound, a bleach catalyst, and a peroxygen bleach precursor;

(ii) gelling droplets resulting from the atomizing step by cross-linking at least 10 weight percent with alkaline earth metal ions; and (iii) drying the gelled droplets to form dry free-flowing particles.

7. Process according to claim 6, wherein the atomizing step is carried out by using a resonating nozzle.

8. Process according to claim 6, wherein the atomization step is achieved by feeding the aqueous suspension through a device selected from the group consisting of a spinning disc, a one-phase nozzle and a two-phase nozzle.

9. Bleaching detergent composition, comprising:

(i) from 10 to 50% by weight of a surfactant;

(ii) from 5 to 80% by weight of a builder; and (iii) a dry free-flowing encapsulated bleach particle present in an effective amount to bleach, the particle comprising:

(a) 1–30% by weight of a coating including a gelled polymer material which is an alginate wherein at least 10% by weight of the gelled polymer material is cross-linked with alkaline earth metal ions;

(b) 99–70% by weight of a core material selected from the group consisting of a peroxygen bleach compound, a bleach catalyst, and a peroxygen bleach precursor, and the core material being surrounded by the coating.

\* \* \* \* \*